United States Patent Office 3,749,588
Patented July 31, 1973

3,749,588
PROTEIN SUPPLEMENTED CLEAR
FRUIT JELLIES
John Earl Hunter, Cincinnati, Ohio, assignor to The
Procter & Gamble Company, Cincinnati, Ohio
No Drawing. Filed Sept. 30, 1971, Ser. No. 185,401
Int. Cl. A23l 1/06
U.S. Cl. 99—132           7 Claims

ABSTRACT OF THE DISCLOSURE

The addition of acid soluble protein to pectin based jellies to produce nutritionally improved jelly products. Importantly, the characteristic color and clarity of the jelly products are unimpaired by the protein supplementation.

BACKGROUND OF THE INVENTION

This invention relates to a protein supplemented, pectin-based clear jelly product which has unimpaired color and clarity. The product of this invention is a nutritionally improved jelly product where formerly jellies had a minimal protein content and consisted of essentially pure sugar in combination with a pectin base mixed in the presence of an acid. Acid is present in jelly in the form of citric acid and other organic acid components. It is necessary for the acid to remain in the final jelly product so that the jelly retains its characteristic pectin flavor. Normally, pectin-based jellies contain only $\frac{1}{10}$ of 1% protein and thus constitute "empty calories" in that virtually no protein foodstuffs are included in the remaining 99.9%. The defect in prior attempts to protein supplement fruit jellies was that the protein, when introduced into the pectin jelled composition, would precipitate causing a segregation of components of the mixture resulting in a turbid, cloudy appearance in the final jelly product. The cause of the precipitation was found to be the excessive acidity of pectin based jelly products which have a pH ranging from 2.6 to 3.5.

Therefore, an object of this invention is the development of a nutritionally improved jelly product where formerly jellies had no nutritional value and consisted of essentially pure sugar in combination with an acid media.

Further, it is an object of this invention to provide a protein supplemented, pectin based clear jelly product characterized by a clear, unimpaired appearance in addition to being a nutritional food product. The method of accomplishing these and other objects will become apparent from the detailed description of the invention set out below.

SUMMARY OF THE INVENTION

The present invention is based on the discovery that by using an acid-soluble protein isolate as a jelly protein supplement, the protein supplement does not precipitate and therefore the jelly product maintains its characteristic clear appearance. The preferred range of protein concentration in the supplemented jelly product is 1%–5% although the concentration may be as low as 0.3% or as great as 10% and may be varied to suit particular protein sources and jelly flavors.

DETAILED DESCRIPTION OF THE INVENTION

Pectin based jellies are generally known. In this regard, see William E. Elwell, Pectin: Its Manufacture, Properties, and Uses (1939), and Food Drug Cosmetic Law Reports 21 CFR 29.2 #51.792 (1967). However, the particular products of this invention are not known to be described in the prior art. Nor is the fact that a pectin jelled product can be supplemented with acid soluble protein known to be described in the prior art. The only known prior art is Pettibone, U.S. 2,627,465, which is confined specifically to the removal of the characteristic soy protein taste from food compositions containing soybean additives.

The novel products claimed herein are protein supplemented, pectin-based, clear jelly products. More particularly, this invention relates to the combination of an acid soluble protein isolate with a pectin based gel to form the desired improved jelly product.

In accordance with this invention, a gel-forming composition characterized by the above mentioned qualities of improved nutritional value in addition to favorable color and clarity may be prepared by mixing together 35–45% fruit juice, 34%–44% sugar, 12%–20% pectin and 0.3%–10% acid soluble protein isolate. This mixture, when properly made in the presence of heat and stirring, results in a jelly product which after cooling is rigid, readily unmoldable, and of excellent texture.

The terms pectin or pectins, designate a group of high molecular weight substances related to carbohydrates and found in varying quantities in fruits and plants. More specifically, the term pectin designates those water soluble pectinic acids of varying methyl ester content and degree of neutralization that are capable of forming gels with sugar and acid under suitable conditions. Pectins are generally derived by dilute-acid extraction of the inner portion of the rind of citrus fruits, or of fruit pomaces, usually apple.

The pectin product may be prepared from, e.g. apple pomaces or citrus peel by a process wherein undesirable solubles may be first removed by a water leaching treatment. The moist, leached material may then be treated with an acid at elevated temperatures. The time and pH of the treatment being interdependent. During the acid treatment, the pectin is solubilized. The inert fibrous material may be separated from the aqueous pectin extract and the pectin is recovered in jelled form or may be dried by precipitation.

The pectin so produced may fined ready use in the formation of jellies by combining with various fruit and fruit juices. More specifically, the pectin may be produced in the form of a mixture containing 5%–8% of pectin together with a substantial amount of dispersant or filler, usually a carbohydrate such as glucose or dextrose. It will be apparent that the amount of pectin in a jelly will be dependent on the jelly grade, i.e. the jelling ability. This mixture commonly contains an acid in an amount sufficient to permit attainment in the jelly product of the desired pH. Citric acid is commonly employed in an amount sufficient to give a product a pH of 2.6 to 3.5.

The actual improvement in nutritional value due to the jelly protein supplement provided by this invention is extremely difficult to determine. However, one method that can be used to rate nutritional value is percentage protein in the final jelly product. As stated previously, normally jelly contains at most a 0.1% protein concentration whereas the jelly product of this invention contains a 0.3% to 10% protein concentration. Therefore, at a minimum there is a threefold and up to a hundredfold increase in the final jelly product.

Sources of the necessary acid soluble protein used herein as a nutritional supplement include, but are not limited to, soybean, cottonseed, milk protein, egg protein, and other forms of animal and vegetable derived protein. The preferred protein source is cottonseed.

The acid soluble protein isolates necessary for use herein may be obtained by means of several commercially known processes. By way of example, cottonseeds or soybeans are subdivided by means of grinding and then flaked in the presence of heat to a flake thickness of .007 inch. The flaked product is then hexane extracted resulting in flakes containing approximately 52% protein by weight and an oil product which is retained for other purposes. The flakes are then subjected to low temperature desolventizing followed by treatment with dilute sodium hydroxide resulting in a dried product which can be used as animal feed and also resulting in a solution containing essentially all the carbohydrates and a small percentage of the protein. The remaining two-thirds forms a precipitate which contains approximately 95% by weight protein. This is an isoelectric precipitate which can be put into solution and then reprecipitated at the desired pH, i.e. 2.6–3.5. The final precipitate is in the form of an insoluble whey which can be discarded and a soluble whey which can be used in the jelly product following drying to remove excess water. This process is not unique to cottonseed, and may be used with other protein sources with minor variations in precedure. Actual laboratory experimentation done with Edi-Pro N (soy-protein isolate) as vegetable protein source resulted in vegetable protein isolate that was 67% soluble at a pH of 3.0 and only 1.5% soluble at a pH of 4.0. Therefore, at normal jelly acidity, i.e. pH 3.0, two-thirds of the protein produced according to this process may be added to the jelly.

As before mentioned animal protein such as Calcium Protolac can be used as the acid soluble protein isolate. Calcium Protolac is recovered from dairy cheese whey by precipitation with polyphosphate and neutralized with calcium hydroxide. This process is conducted according to the disclosure in Wingerd, Canadian Pat. 790,580, issued July 23, 1968. One particular experiment resulted in 33.4% solubility of the protein isolate in acid at a pH of 3.0 and 27% solubility at pH 3.5. The same favorable conclusion may be drawn from this data as was drawn from the preceding data given with respect to a vegetable protein, i.e. that the protein isolate, because of its acid solubility within the pH range of 2.6 to 3.5, can be conveniently added to acidic jellies.

An alternative method of producing the protein isolate has been disclosed by Wilda Martinez in Journal of Agricultural and Food Chemistry, vol. 18, page 961 (1970). This process involves washing cottonseed meal with water at a pH of 7.0. This results in a first supernatant which is discarded and a precipitate (residue) which is treated with sodium hydroxide. The resulting residue and second supernatant have a pH of 10–12. The residue is discarded and the second supernatant, which contains 50%–70% protein by weight, is treated with an edible acid, i.e. citric, hydrochloric (dilute), sulfuric (dilute), to lower the pH to 7.0. This results in a third supernatant which is discarded and a brownish precipitate which is 100% acid soluble at a pH of 3.0. This precipitate may be conveniently added to jellies at a pH of 3.0.

In the preparation of protein supplemented jellies it is critical that the fruit juice base be divided into two portions. The sugar (sucrose) and pectin are added to the first portion in the presence of heat and stirring until the boiling point has been reached and maintained for at least one minute. The acid soluble protein isolate is added to the second fruit juice portion without the addition of heat as proteins are denatured by heat which ultimately results in a significant loss in nutritional value. Likewise, when the two fruit juice portions are combined to form the final jelly product it is critical that the first portion (heated to boiling point) be cool enough so that the protein isolate is not denatured. Denaturation of the protein isolate is undesirable because the highly ordered structure of the protein isolate would be replaced by a looser and more random structural configuration that reduces solubility, prevents crystalization, and decreases nutritional value of the acid soluble protein isolate. Therefore, in order to prevent protein denaturation it is critical that the fruit juice-protein solution not be added until the fruit juice-sugar solution has cooled sufficiently to form a partial gel which will insure a temperature low enough to protect the molecular structure of the protein isolate.

The following example illustrates the practice of this invention.

Example 1

In accordance with this invention a product illustrating formation of a pectin-based, protein supplemented, clear jelly was prepared according to the formula:

| Mix: | Grams |
|---|---|
| Grape juice | 11.7 |
| Sugar (sucrose) | 21.5 |

The grape juice-sucrose mixture was heated to boiling with stirring. When stirring no longer reduced the boiling, 9.0 grams of pectin was added and the mixture was boiled for one minute. The boiled mixture was removed from the heat and allowed to cool to form a partial gel. Excess foam was skimmed off the resulting partial gel.

Ten grams of grape juice and 2.8 grams of acid soluble (at pH 3.0 68% is soluble) protein (cottonseed protein isolate prepared as previously described) are mixed together. The first grape juice-sucrose mixture is added to this second mixture and they are stirred together. The resulting combined mixture is poured into a container and allowed to cool. The jelly set to a firm gel on cooling. The jelly was rigid, readily unmoldable, and of excellent texture and clarity.

In addition, the final jelly product contained 5.2% protein by weight, 16.3% pectin by weight, 39.1% sugar by weight, and 39.4% fruit juice by weight.

What is claimed is:

1. A method for preparing a protein supplemented, pectin-based clear jelly product which comprises dividing a quantity of fruit juice into two portions, thereafter adding sugar and pectin to the first portion and adding an acid soluble protein isolate to the second portion; boiling the first portion and then allowing the first portion to cool until a partial gel is formed at which time the second fruit juice portion is added and the combined portions are allowed to cool resulting in a jelly product which is protein supplemented, rigid, and of clear texture.

2. A nutritionally improved clear jelly product comprising: 35%–45% fruit juice, 34%–44% sugar, 12%–20% pectin, and 0.3%–10% acid soluble protein isolate.

3. The food composition of claim 2 wherein the acid-soluble protein concentration is from 1% to 5% by weight.

4. The food composition of claim 2 wherein the acid-soluble protein is vegetable protein isolate.

5. The food composition of claim 2 wherein the acid-soluble protein is an animal protein isolate.

6. The food composition of claim 3 wherein the protein is soluble at pH's within the range of from 2.6 to 3.5.

7. The food composition of claim 4 wherein the protein is soluble at pH's within the range of from 2.6 to 3.5.

References Cited

UNITED STATES PATENTS 3,218,307  11/1965  Eldridge _____ 99—131

ALVIN E. TANENHOLTZ, Primary Examiner

J. M. HUNTER, Assistant Examiner